United States Patent
Kim et al.

(10) Patent No.: US 8,839,932 B2
(45) Date of Patent: Sep. 23, 2014

(54) APPARATUS FOR REDUCING TRANSMISSION SHOCK IN AUTOMATIC TRANSMISSION

(75) Inventors: Jin Hyun Kim, Seoul (KR); Chang Kook Chae, Suwon-si (KR); Heung Seok Lee, Seoul (KR); Suk Il Oh, Suwon-si (KR); Wan Soo Oh, Yongin-si (KR); Kwang Min Won, Gunpso-si (KR)

(73) Assignee: Hyundai Motor Company, Seoul (KR)

( * ) Notice: Subject to any disclaimer, the term of this patent is extended or adjusted under 35 U.S.C. 154(b) by 396 days.

(21) Appl. No.: 13/231,213

(22) Filed: Sep. 13, 2011

(65) Prior Publication Data

US 2012/0292154 A1 Nov. 22, 2012

(30) Foreign Application Priority Data

May 19, 2011 (KR) ........................ 10-2011-0047551

(51) Int. Cl.
F16D 25/12 (2006.01)
F16D 25/06 (2006.01)
F16F 1/34 (2006.01)

(52) U.S. Cl.
USPC ........................................ 192/85.34; 267/161

(58) Field of Classification Search
USPC ........................................ 192/85.34; 267/161
See application file for complete search history.

(56) References Cited

U.S. PATENT DOCUMENTS

| 3,285,379 | A | * | 11/1966 | Helquist | 192/85.34 |
| 4,623,055 | A | * | 11/1986 | Ohkubo | 192/85.34 |
| 5,483,850 | A | * | 1/1996 | Yamauchi | 192/85.34 |
| 5,743,369 | A | * | 4/1998 | Lorriette | 192/85.34 |
| 6,044,948 | A | * | 4/2000 | Okada et al. | 192/85.34 |
| 7,334,784 | B2 | * | 2/2008 | Kobelev et al. | 267/161 |
| 8,104,598 | B2 | * | 1/2012 | Lee | 192/85.42 |

FOREIGN PATENT DOCUMENTS

| JP | 5-296327 A | 11/1993 |
| KR | 10-0299790 B1 | 11/2001 |
| KR | 10-2009-0054153 A | 5/2009 |
| KR | 10-2009-0075344 A | 7/2009 |
| KR | 10-0953307 B1 | 4/2010 |

* cited by examiner

Primary Examiner — Jacob S Scott
(74) Attorney, Agent, or Firm — Morgan, Lewis & Bockius LLP

(57) ABSTRACT

An apparatus for reducing transmission shock of an automatic transmission may include a piston operated by a control pressure, a clutch performing a clutching operation by an operation of the piston, and a cushion spring arranged between the piston and the clutch which varies by stages in stiffness of the spring with an operating position of the piston. The cushion spring may be formed with one or more sets of a plurality of curved-surface springs bent in an operating direction of the clutch and connected with each other, each set of the plurality of curved-surface springs having a different bending height.

3 Claims, 7 Drawing Sheets

APPARATUS FOR REDUCING TRANSMISSION SHOCK IN AUTOMATIC TRANSMISSION

CROSS-REFERENCE TO RELATED APPLICATION

The present application claims priority of Korean Patent Application Number 10-2011-0047551 filed May 19, 2011, the entire contents of which application is incorporated herein for all purposes by this reference.

BACKGROUND OF INVENTION

1. Field of Invention

The present invention relates to an apparatus for reducing transmission shock in an automatic transmission. More particularly, it relates to a transmission shock-reducing apparatus for an automatic transmission which serves to reduce transmission shock by securing robustness against impact torque produced in the course of the interconnections of clutches during a gearshift.

2. Description of Related Art

An automatic transmission, which is an apparatus for automatically shifting gear shift stages of a multi-stage transmission into an appropriate gear shift stage in response to a vehicle speed, generally includes at least one or more planetary gear set having sun gears, ring gears, and planet carrier as operating members to realize an automatic shift, and further includes a plurality of frictional engaging elements such as clutches and brakes to control the operation of the operating members.

The automatic transmission is provided therein with a hydraulic control system to hydraulically control such frictional elements, and serves to realize each of the shift stages so that the clutches and brakes selected in accordance with each of the shift stages may be controlled to be clutched or released.

The clutches among the frictional engaging elements serve to transfer power of an engine to the operating members of the planetary gear set, or to connect and disconnect the power transfer between the operating members.

Such clutches are formed with a plurality of clutch disks and frictional materials alternately inserted between a clutch hub and a clutch drum and serve to connect or disconnect the power transfer by applying a hydraulic pressure to a piston.

For example, when oil flows into a space between the piston and clutch drum through oil holes formed in the clutch hub during a gear shift, the piston enables the frictional material and the clutch disk to become in contact with each other by a hydraulic pressure, thereby the clutches are operated.

However, since such a conventional automatic transmission has difficulty eliminating basically backlash existing in a driving system and transient torque generated during shifting, a high hydraulic pressure is abruptly applied to the piston when the automatic transmission is operated and an abrupt impact in the automatic transmission may accordingly be generated, thereby resulting in transmission shock, clunk noise and the like, which are difficult to solve.

It has been well known that most of the problems generated in such a conventional automatic transmission are caused by such transmission shock occurred at the time of a link between the clutches (or a close contact of a clutch disk with a frictional material). The impact torque generated at that time is amplified due to backlash of a driving system and then transferred to a driver through a transferring system.

To reduce transmission shock of the conventional automatic transmission, a method of increasing a shift time (or transmission time) has been adopted. It, however, results in a shift response delay.

That is to say, transmission shock deteriorates when the shift time of an automatic transmission is reduced and the shift response (or transmission response) is delayed when the shift time is prolonged The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide an apparatus for reducing transmission shock of an automatic transmission which is capable of reducing shock generated at the time of a shift by employing a cushion spring having a stiffness property that varies by stages with a position of a piston action and which is capable of realizing a soft clutching property of clutches.

One aspect of the present invention is directed to provide an apparatus for reducing transmission shock of an automatic transmission which includes a piston operated by a control pressure, a clutch performing a clutching operation by an action of the piston, and a cushion spring arranged between the piston and the clutch which varies by stages in stiffness of the spring with an operating position of the piston, thereby reducing the transmission shock caused by the clutch coupling.

Exemplary cushion springs are formed by connecting each other a plurality of curved-surface springs curved in an operating direction of the clutch, and the plurality of curved surface springs include at least one set of curved surface springs having different curved heights.

In the apparatus for reducing transmission shock in an automatic transmission according to the present invention, stiffness of a cushion spring increases by stages in response to a displacement of a piston during shifting, thereby reducing transmission shock in the automatic transmission that is occurred at the time of clutching, and accordingly enabling to rapidly control a transmission hydraulic pressure for operating a piston to secure a transmission response performance.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2b is a partly enlarged view and a plan view of the exemplary cushion spring in FIG. 2a;

FIG. 3b is a partly enlarged view and a plan view of the another exemplary cushion spring in FIG. 3a;

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a transmission shock-reducing apparatus for an automatic transmission which serves to reduce transmission shock by securing robustness against impact torque produced in the course of coupling of clutches during a gearshift, which is made to enhance a transmission comfort and a transmission response property by employing a cushion spring that is multi-staged in stiffness property in response to a piston operation during a gearshift.

Hereinafter, various exemplary embodiments of the present invention will now be described in detail with reference to the accompanying drawings.

Figure 1:
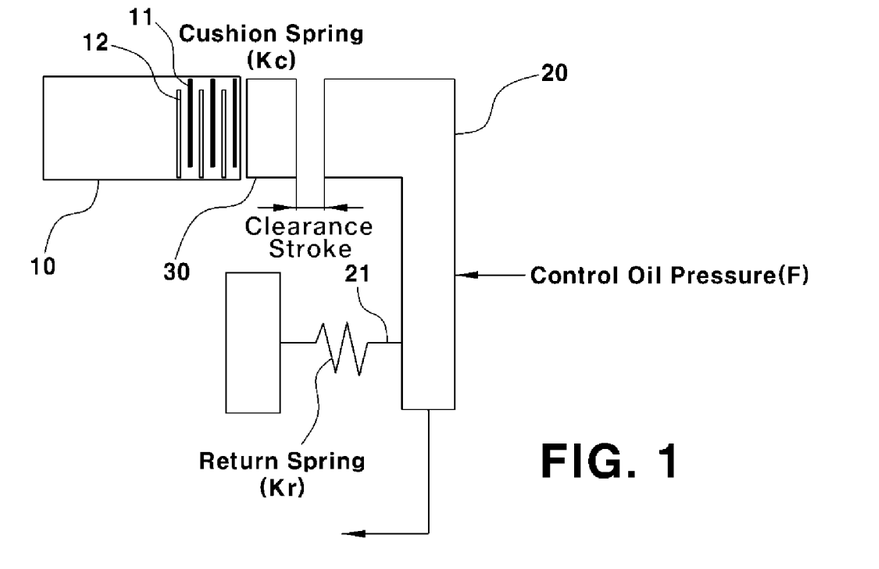
FIG. 1 is a schematic diagram showing an exemplary apparatus for reducing transmission shock in an automatic transmission according to the present invention.

Various aspects of the present invention include a cushion spring 30 which is formed in a multi-stage bent shape and arranged between a clutch 10 and a piston 20 in an automatic transmission, as shown in FIG. 1.

The cushion spring 30 may be mounted at one side of the clutch 10, for example, by coming into face-contact with one side of a frictional member 11 by a frictional force, and arranged in a predetermined distance from a piston 20.

Such cushion spring 30 is in direct contact with the piston 20 when the piston is operated according to a gear shift to be pressed thereby transferring a load of the piston to the clutch 10.

The clutch 10 is inserted alternately with a plurality of the frictional members 11 and the clutch disks 12 between a clutch hub and a clutch drum and operated by enabling the piston 20 operated by a control pressure (oil pressure or air pressure) to compress the clutch disks 12 and the frictional members 11 through the cushion spring 30 so as to be in close contact with each other.

The piston 20 is installed so as to be supplied with an elastic force of the return spring 21.

Figure 2A:
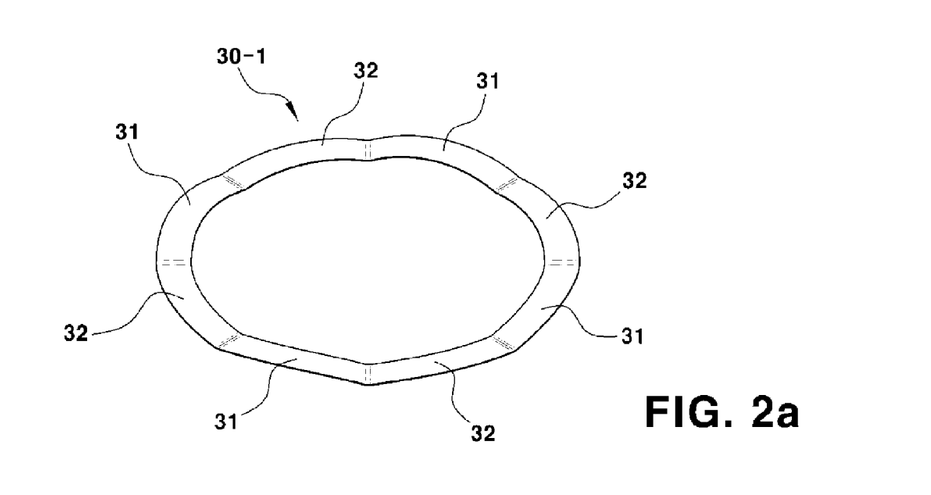
FIG. 2a is a perspective view showing an exemplary cushion spring according to the present invention.
Figure 2B:
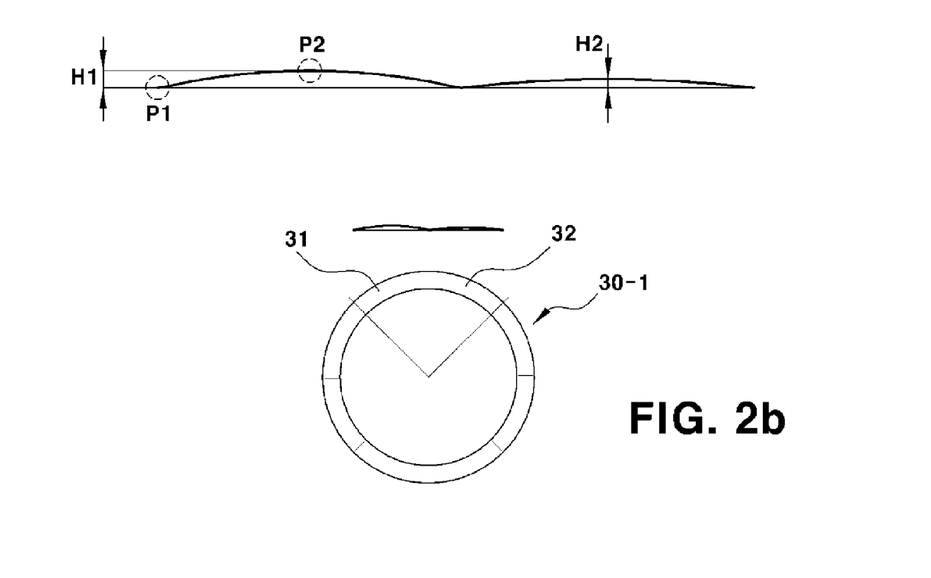

FIG. 2a is a perspective view showing an exemplary cushion spring according to the present invention, and FIG. 2b is a partly enlarged view and a plan view showing the cushion spring shown in FIG. 2a.

As shown in the drawings, the exemplary cushion spring 30-1 according to the present invention is formed with a plurality of curved surface springs 31, 32, or the like, each having a bent shape so as to increase by stages stiffness of spring in accordance with an operating position of the piston 20, which are connected with each other.

In other words, the cushion spring 30-1 installed between the clutch 10 and the piston 20 is formed in a substantially ring shape with the curved surface springs 31, 32 connected with each other in an operating direction of the clutch 10 (in a direction that the frictional members and clutch disks move so as to be in contact with each other).

The cushion spring 30 may be formed with multiple sets of curved-surface springs. For example, it may be formed with one set of curved-surface springs, that is a plurality of curved-surface springs each having a shape bent in an operating direction of the clutch 10. Or it may be formed with two sets of curved-surface springs, that is, a plurality of first curved surface springs 31 bent in an operating direction of the clutch 10 and a plurality of second curved surface springs 32 bent in an operating direction of the clutch 10, which are connected with each other, as shown in FIG. 2a.

As shown in FIG. 2b, the first curved surface springs 31 and the second curved surface springs 32 are connected with each other, thereby forming a wave form and having a bending height H1 and a bending height H2 which are different in the bending ratio from each other.

The bending heights H1 and H2 indicate the shortest distances along straight lines between a lower point P1 of wave and an upper point P2 of waves of each of the curved surface springs 31, 32. Here, the lower point P1 of wave is a lowest position of each of the curved surface springs 31, 32 and the upper point P2 of wave is a highest position of each of the curved surface springs 31, 32.

The operation of the cushion spring 30-1 during a gearshift according to various embodiments of the present invention will now be described.

The piston 20 is operated by a hydraulic control system and a plurality of clutch disks 12 are thereby compressed with the frictional member 11 interposed therebetween. At this time, the upper point P2 of wave of the first curved surface springs 31, which is the highest position in the bending height of the cushion spring 30-1, becomes in first contact with the piston 20 operated by a control oil pressure or gas pressure thereby being pressed so that the transmission shock may be absorbed in a first stage. And then, the piston 20 moves gradually so as to be in contact with the upper point H2 of wave of the second curved surface springs 32 having a second bending height, and accordingly the first and second curved surface springs 31, 32 are simultaneously pressed thereby increasing spring stiffness of spring such that the transmission shock caused by the coupling of the clutch 10 is gradually absorbed and reduced.

Figure 3A:
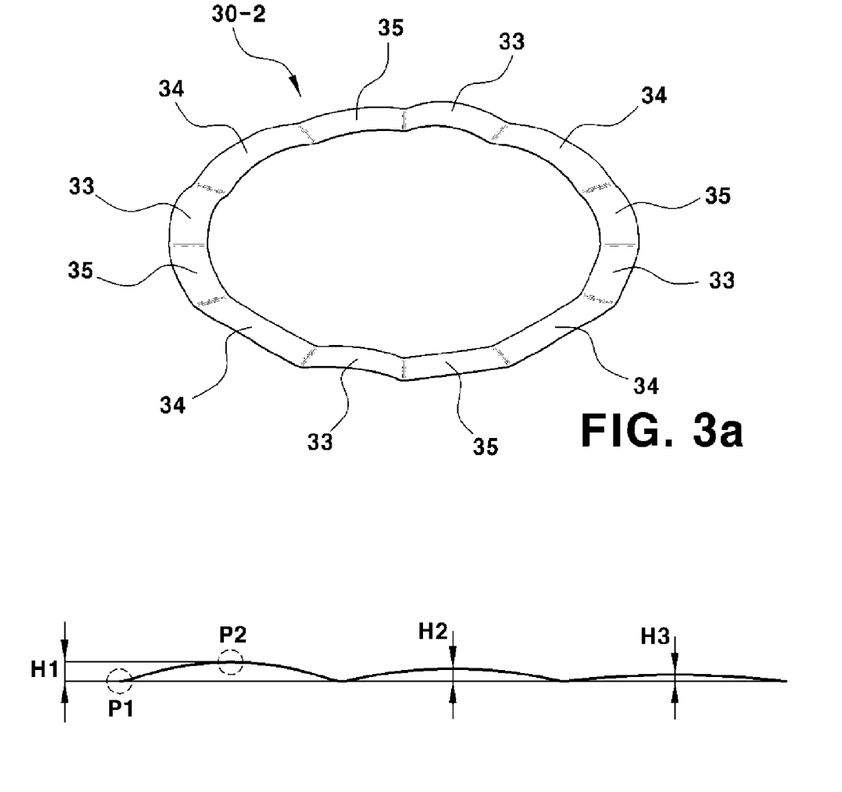
FIG. 3a is a perspective view showing another exemplary cushion spring according to the present invention.
Figure 3B:
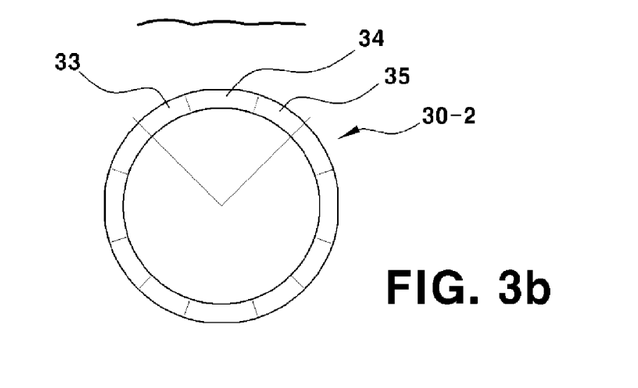

FIG. 3a is a perspective view showing another exemplary cushion spring according to the present invention, and FIG. 3b indicates a partly enlarged view and a plan view each showing the cushion spring shown in FIG. 3a.

As shown in the drawings, the exemplary cushion spring 30-2 according to the present invention is formed in a substantially circular shape with three sets of curved surface springs: the first, second and third curved surface springs 33, 34, and 35 each having a bent shape in an operating direction of the clutch 10, which are connected with each other.

As shown in FIG. 3b, the first, second and third curved surface springs 33, 34, and 35 are connected with each other thereby being formed in a wave form, which have different bending heights H1, H2, and H3, respectively.

The operation of the exemplary cushion spring 30-2 during a gearshift according to the present invention will now be described.

The piston 20 moves towards the clutch 10 by a pushing force of a hydraulic control system to press the return spring 21 and a plurality of clutch disks 12 are thereby compressed tightly with the frictional members 11 interposed therebetween. At this time, the upper point P2 of wave of the first curved surface spring 33, which is the highest position in the bending heights of the cushion spring 30-2, becomes in contact first with the piston 20 operated by a control oil pressure thereby being pressed so that the transmission shock may be absorbed in a first stage. And then, the piston 20 moves gradually so as to be in contact with the upper point P2 of wave of the second curved surface spring spring 34 having a second bending height, and accordingly the first and second curved surface springs 33, 34 are simultaneously pressed thereby increasing stiffness of spring such that the transmission shock caused by the coupling of the clutch 10 is further absorbed and reduced. In addition, the upper point P2 of wave of the third curved surface spring 35, which is the lowest position in the bending heights of the cushion spring 30-2, is also pressed by the piston 20. As a result, the first, second and third curved surface springs 33, 34, 35 are simultaneously pressed, thereby the 3-staged stiffness of the cushion spring 30-2 acts in the clutch 10 so that the transmission shock caused by the coupling of the clutch 10 is absorbed by stages and reduced.

That is to say, as the piston 20 operated by a hydraulic control system damps down the low stiffness of the return spring 21 and the multi stage stiffness of the cushion spring 30-2 by stages, the piston 20 is coupled to the clutch 10 thereby reducing the transmission shock caused by the coupling of the clutch.

As described above, to reduce the transmission shock of the automatic transmission according to the present invention, various exemplary cushion springs 30 arranged between the clutch 10 and the piston 20 may be formed with multiple sets of curved surface springs, for example, 31 and 32, or 33, 34 and 35, each having different bending heights and connecting with each other. The curved surface springs 31 and 32, or 33, 34 and 35 forming such a cushion spring 30 may be changed and controlled in the connection order and in the number by modifying the design for an effective absorption of the transmission shock.

In this manner, the automatic transmission according to the present invention includes the cushion spring 30 which is arranged between the piston 20 and clutch 10 and which has a multi-stage stiffness that varies by stages with the operation of the piston 20, thereby enabling to gradually increase stiffness of the cushion spring 30 by stages with the displacement of the piston 20 to realize a similar effect of nonlinear stiffness formed in combination of hysteresis and multi-staged stiffness of a spring, resulting in the reduction in the transmission shock generated at the time of coupling of the clutch 10. This is different from an existing automatic transmission which undergoes an abrupt change in the stiffness when clutches are coupled in an early low stiffness state of a return spring during a gear shift.

Meanwhile, to check a movement of the piston in the case where the cushion spring according to the present invention is applied to an existing automatic transmission of a vehicle, one-stage cushion spring, two-stage cushion spring, and three-stage cushion spring each are applied to automatic transmission samples to measure the change in speed of a piston during a predetermined time.

Here, the one-stage cushion spring is formed with curved surface springs all having a same bending height, the two-stage cushion spring is formed with two sets of curved surface springs each having a different bending height, and the three-stage cushion spring is formed with three sets of curved surface springs each having different bending height.

And, to compare the automatic transmission according to the present invention with the existing automatic transmission, changes in speed of a piston of the existing automatic transmission have also been measured.

Figure 4:
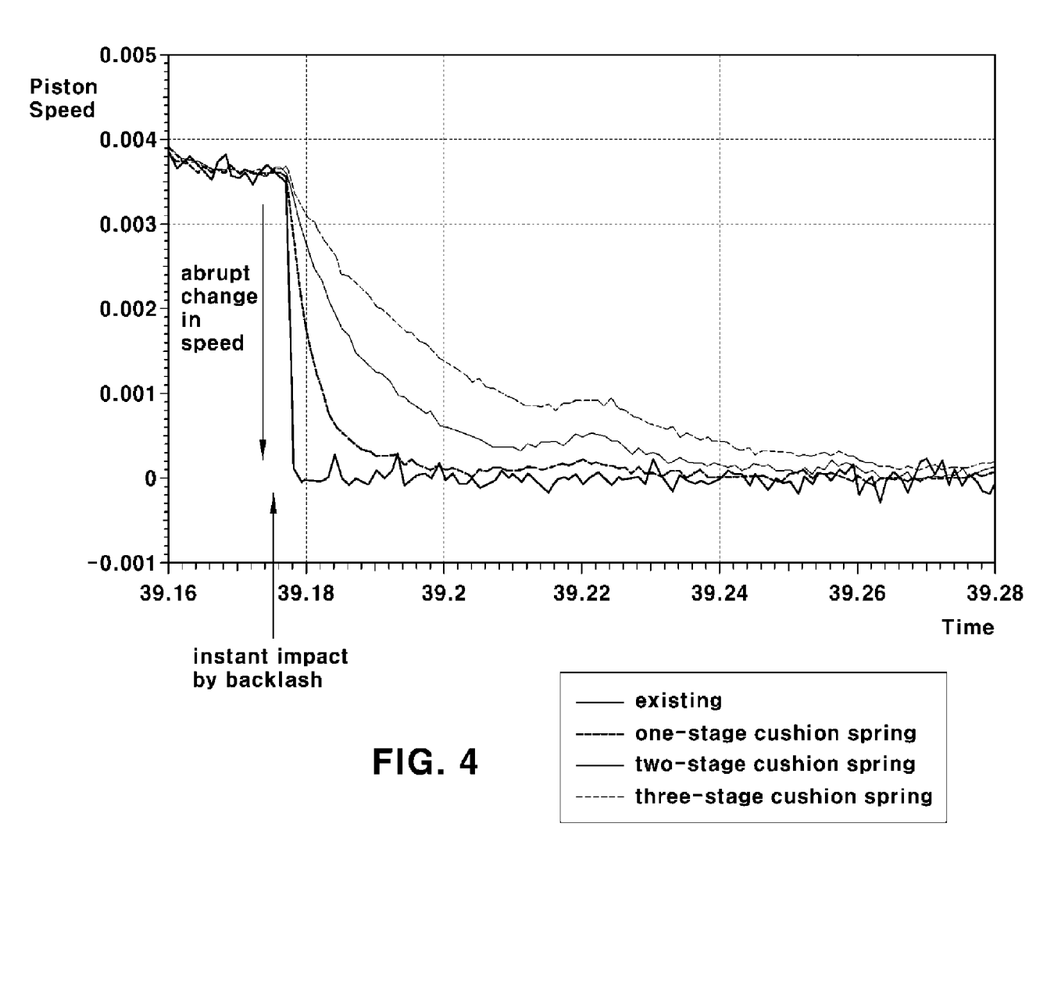
FIG. 4 is a graph showing changes of piston speed of a vehicle with or without exemplary cushion springs of the present invention implemented.

As the result shown in FIG. 4, the existing vehicle to which a cushion spring is not applied undergoes an abrupt change in the speed of a piston at a coupling position of the clutches. In contrast, each of the vehicles to which the one-stage, two-stage, and three-stage cushion springs are applied experiences a gradual change in the speed of a piston as compared with the existing vehicle. Particularly, in the case of the vehicle to which the three-stage cushion spring is applied, the speed (i.e. movement) of the piston changes gradually at a coupling position of the clutches.

Figure 5:
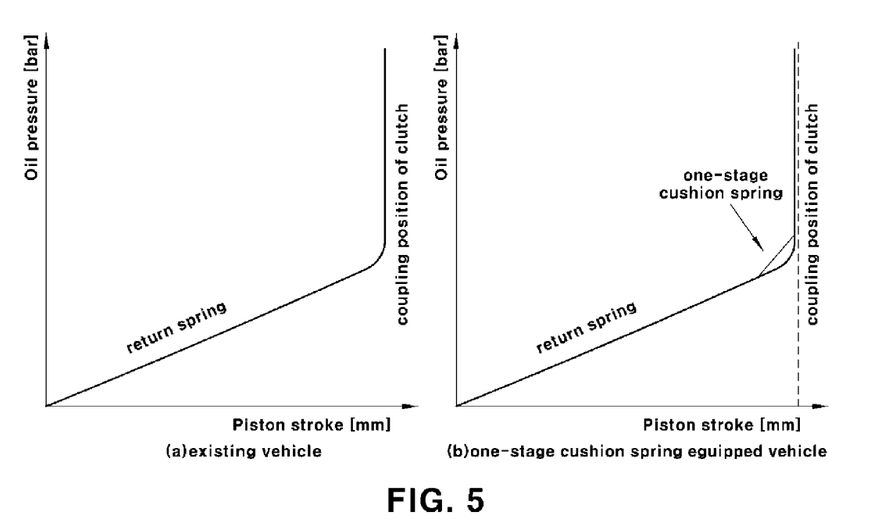
FIGS. 5 and 6 are charts comparing stiffness properties of a vehicle during a gearshift with or without exemplary cushion springs of the present invention implemented.
Figure 6:
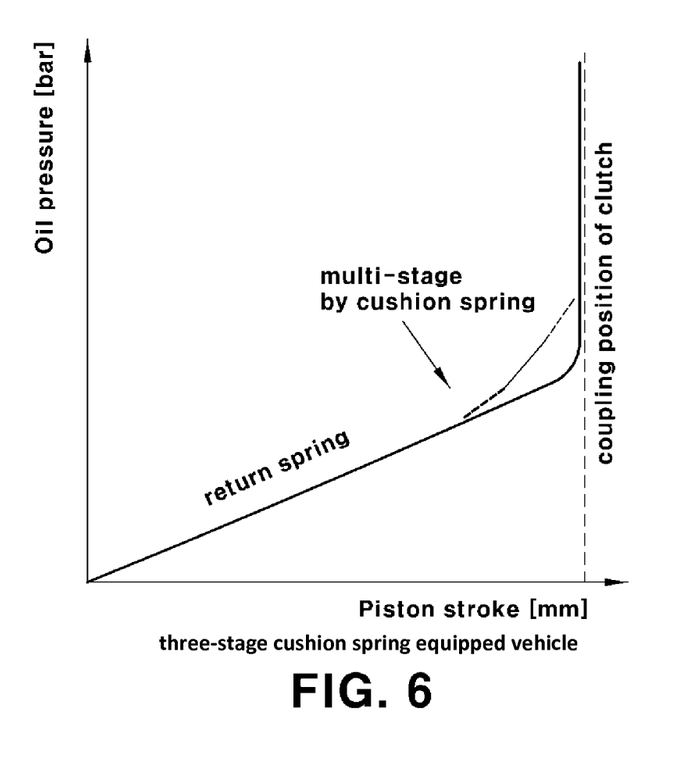

FIG. 5 and FIG. 6 show multi-stage stiffness properties of one stage and three stage cushion spring comparing to that of a vehicle with no cushion spring, which are plotted according to a displacement of a piston operated by a control oil pressure F during a gearshift.

As shown in the drawings, it can be verified that the movement of a piston changes gradually at a coupling position of clutches, compared with the existing transmission. Particularly, the movement of a piston in the three-stage cushion spring-applied vehicle changes more gradually at a coupling position of clutches, compared with the existing transmission.

As shown in FIG. 5, in the case of the one-stage cushion spring equipped vehicle, the movement of a piston changes gently at a coupling position of clutches. In contrast, in the case of the existing vehicle to which a cushion spring for reducing transmission shock is not applied, the movement of a piston changes abruptly, thereby generating transmission shock and lowering a transmission response performance.

Accordingly, it can be seen from the present invention that the more multi-stage stiffness in the cushion spring is applied, the smaller the impact force acting on the clutches at the time of coupling of the clutches is generated, thereby securing robustness against a final transmission shock and an impact torque produced in the course of the interconnections of clutches during a gearshift. In addition, the smaller impact force enables not only to secure robustness against backlash of a driving system but also to promptly control an oil pressure for operating a piston, so that a transmission response performance may be secured.

That is, it enables to secure a transmission response property and a transmission NHV (Noise, Vibration, Harshness) when a gear shift of an automatic transmission is performed.

Figure 7:
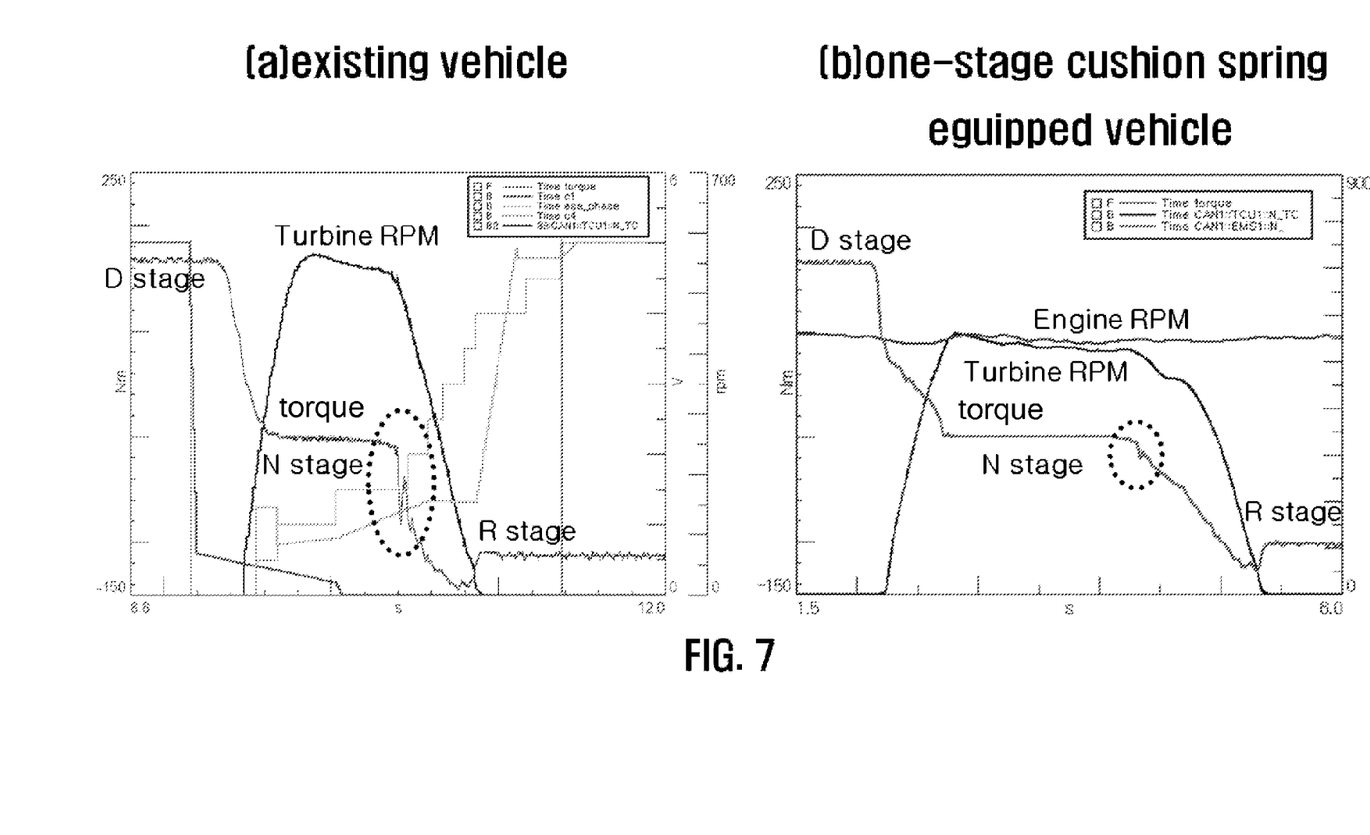
FIG. 7 compares measured results of a 8-speed transmission in a real vehicle with or without exemplary apparatuses of the present invention implemented.

Also, the one-stage cushion spring is applied to a frictional region (between a clutch and a piston) of a single 8-speed transmission, the resultant transmission is mounted on a real vehicle, and the resultant real vehicle is tested. FIG. 7 shows the results.

And, to compare the vehicle equipped with an exemplary apparatus according to the present invention with the existing vehicle, an impact torque generated in the existing 8-speed transmission equipped vehicle to which a cushion spring is not applied has also been measured at the time of a gearshift.

As shown in FIG. 7, the impact torque (indicated as a dotted circle in right graph) in the one-stage cushion spring equipped vehicle is remarkably reduced at the time of a gearshift, compared with the impact torque (indicated as a dotted circle in left graph) in the existing vehicle at the time of a gearshift. Accordingly, the present invention enables to secure remarkable hardware robustness against a final transmission shock produced in the course of the interconnections of clutches during a gearshift.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for reducing transmission shock of an automatic transmission, the apparatus comprising:
    a piston operated by a control pressure;
    a clutch performing a clutching operation by operation of the piston; and
    a cushion spring arranged between the piston and the clutch, wherein stiffness of the cushion spring varies by stages in accordance with an operating position of the piston;
    wherein the cushion spring is formed with at least three sets of a plurality of curved-surface springs bent in an operating direction of the clutch and connected with each other;
    wherein the plurality of curved-surface springs include first, second and third curved-surface springs sequentially connected in a circumferential wave form, and wherein the first, second and third curved-surface springs have different bending heights H1, H2 and H3, respectively.

2. The apparatus of claim 1, wherein the cushion spring is formed in a substantially ring shape.

3. The apparatus of claim 1, wherein stiffness of the cushion spring varies in stages according to the operating position of the piston so that stiffness of the cushion spring increases when the piston increasingly engages with the clutch.

* * * * *